US009422983B2

(12) United States Patent
Mola et al.

(10) Patent No.: US 9,422,983 B2
(45) Date of Patent: Aug. 23, 2016

(54) ROLLER BEARING WITH MODULAR SHOULDERS

(71) Applicants: Roberto Mola, Turin (IT); Riccardo Restivo, Turin (IT); Piero Santangelo, Turin (IT); Gianpiero Scaltriti, Turin (IT)

(72) Inventors: Roberto Mola, Turin (IT); Riccardo Restivo, Turin (IT); Piero Santangelo, Turin (IT); Gianpiero Scaltriti, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/677,145

(22) Filed: Apr. 2, 2015

(65) Prior Publication Data

US 2015/0285307 A1     Oct. 8, 2015

(30) Foreign Application Priority Data

Apr. 4, 2014   (IT) ............................... TO2014A0282

(51) Int. Cl.
| F16C 33/58 | (2006.01) |
| F16C 19/26 | (2006.01) |
| F16C 33/46 | (2006.01) |
| F16C 33/66 | (2006.01) |
| F16C 33/60 | (2006.01) |

(52) U.S. Cl.
CPC ............... *F16C 33/586* (2013.01); *F16C 19/26* (2013.01); *F16C 33/605* (2013.01); *F16C 33/6651* (2013.01); *F16C 33/6614* (2013.01); *F16C 2226/74* (2013.01)

(58) Field of Classification Search
CPC .......... F16C 19/26; F16C 19/46; F16C 33/58; F16C 33/60; F16C 33/605; F16C 33/76; F16C 33/78; Y10S 384/903

USPC ......... 384/548, 538–539, 560–561, 565–564, 384/572, 903

See application file for complete search history.

(56) References Cited

U.S. PATENT DOCUMENTS

| 3,975,066 | A | * | 8/1976 | Hofmann | ................ F16C 19/06 384/526 |
| 4,123,121 | A | * | 10/1978 | Ernst | .................... F16C 29/0688 384/43 |
| 4,328,999 | A | * | 5/1982 | Olschewski | .......... F16C 29/069 384/43 |
| 5,000,588 | A | | 3/1991 | Prinz | |
| 5,352,047 | A | * | 10/1994 | Ingall | ...................... F16C 19/26 384/526 |
| 6,217,224 | B1 | * | 4/2001 | Kispert | ................... F16C 19/26 384/564 |

FOREIGN PATENT DOCUMENTS

| DE | 1021657 B | | 12/1957 | |
| GB | 151305 A | * | 9/1920 | ............. F16C 19/36 |

* cited by examiner

*Primary Examiner* — Marcus Charles
(74) *Attorney, Agent, or Firm* — Bryan Peckjian; SKF USA Inc. Patent Dept.

(57) ABSTRACT

A rolling bearing is provided that includes an outer ring, an inner ring, and a plurality of rollers disposed between the outer and inner rings to engage a radially outer lateral surface of the inner ring and a radially inner lateral surface of the outer ring and being laterally held, in a direction parallel to a relative rotation axis (A) between the rings, by respective axial shoulders. The axial shoulders each consist of an annular element made of synthetic plastic material as an independent element from the rings that engages in a snapping manner either the inner ring or the outer ring; the inner and outer rings being provided, at their respective radially outer and inner lateral surfaces and at opposite axial ends thereof, with snapping locking seats for the annular elements made of synthetic plastic material each including a continuous annular groove.

16 Claims, 4 Drawing Sheets

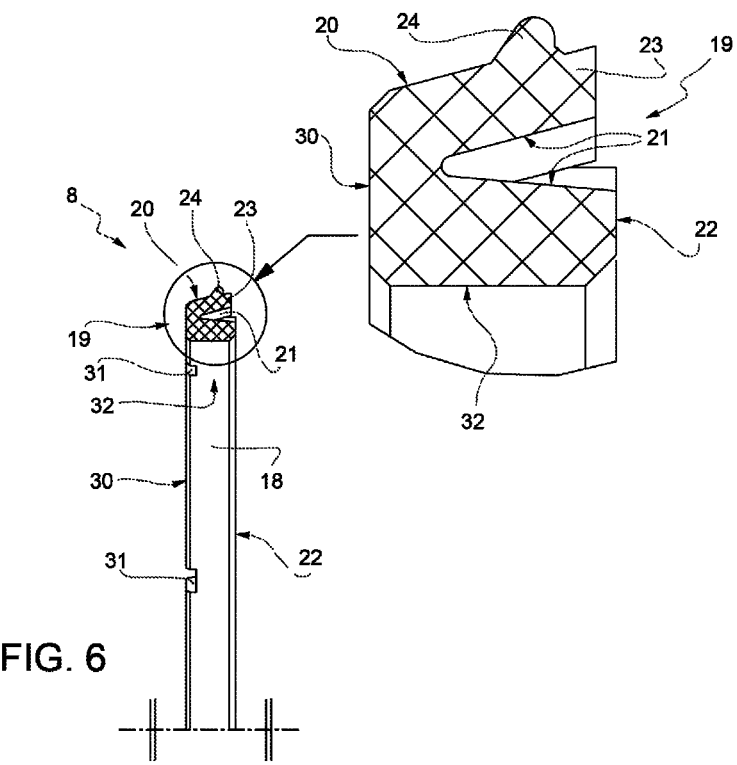
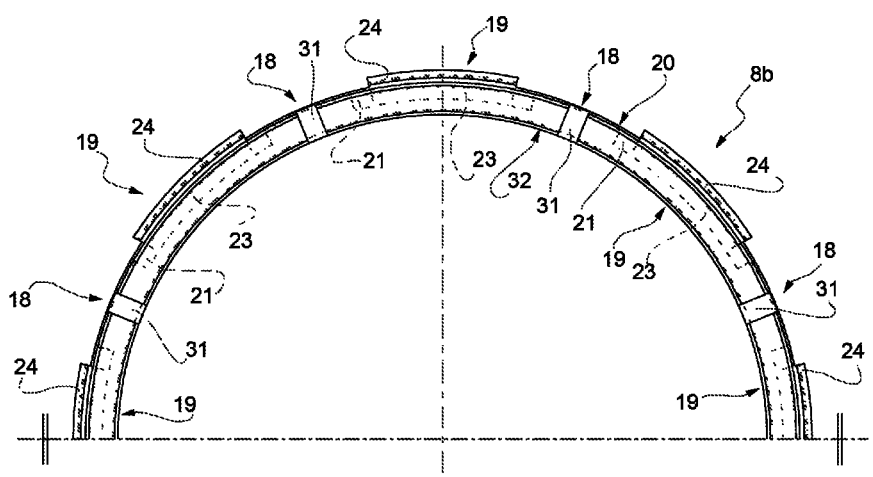

ROLLER BEARING WITH MODULAR SHOULDERS

TECHNICAL FIELD OF THE INVENTION

The present invention relates to a rolling bearing of the roller type, which is cost-effective to be manufactured and which allows to reduce the friction between the revolving bodies, defined by rollers, generally of the cylindrical type, and the radially inner and outer rings of the bearing.

TECHNICAL BACKGROUND

In rolling bearings of the roller type, the revolving bodies, generally consisting of cylindrical rollers, are laterally held in axial direction and towards opposite frontal ends of the inner and outer rings of the bearing, by respective shoulders obtained by mechanical machining directly on the radially inner and radially outer surfaces of the rings, on which the rollers roll in use.

Therefore, according to this solution, the lateral axial holding shoulders of the rollers form an integral part of the rolling tracks of the rollers.

This solution has the drawback of requiring high-precision mechanical machining with narrow tolerances, which are therefore very costly, in order to obtain the shoulders.

Furthermore, the rollers touch the shoulders because of possible axial movements of the rollers themselves, thus producing a relatively high increase of the friction between rollers and rings, with a consequent undesired heating of the bearing and undesired energy losses.

U.S. Pat. No. 5,000,588 does not completely solve these problems.

It is the object of the present invention to provide a rolling bearing of the roller type, which is simple and cost-effective to be constructed while ensuring a perfect lateral guiding of the rollers and which simultaneously has lower friction levels than those of the roller bearings currently in use.

SUMMARY OF THE INVENTION

According to the invention, a rolling bearing of the roller type is thus provided, having the features set forth in the appended claims.

By virtue of the invention, the rollers may be guided in axial direction, both mono- and bilaterally, and both on the inner ring and on the outer ring of the bearing, regardless of the presence of a revolving body cage, which must be absent in the bearings of the full-complement roller type.

Moreover, the same inner and outer rings may be used for bearings having different shoulder configurations according to the various operative needs, thus allowing considerable economies of scale.

Finally, the contact friction between revolving bodies and lateral shoulders of the bearing rings is considerably reduced due to both the type of materials used and because pockets for containing lubricating fluids may be provided on the side of the shoulders facing the inner bearing.

BRIEF DESCRIPTION OF THE DRAWINGS

Further features and advantages of the present invention will become more apparent from the following description of two non-limiting embodiments thereof, made with reference to the figures in the accompanying drawings, in which:

FIGS. 6 and 7 show a radial section view on enlarged scale, with a detail on a further enlarged scale, and a front elevation view of a second element of the bearing in FIGS. 1 and 2, respectively.

DETAILED DESCRIPTION

Figure 1:
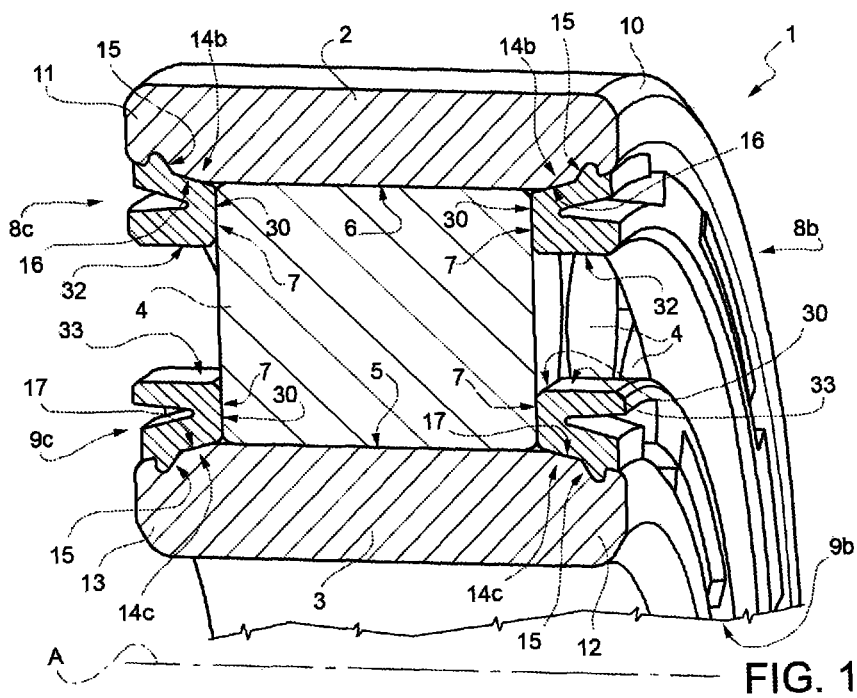
FIGS. 1 and 2 show the same front, three-quarters perspective view in radial section, with parts removed for simplicity, of a first and a second possible non-limiting embodiment of a rolling bearing of the roller type according to the invention.

With reference to FIGS. 1 and 3 to 7, reference numeral 1 indicates as a whole a rolling bearing of the roller type, comprising a radially outer ring 2, a radially inner ring 3 and a plurality of revolving bodies defined by rollers 4 interposed between the radially outer ring 2 and the radially inner ring 3 and grouped, in the non-limiting example shown, into a crown of revolving bodies. Obviously, the following description may also apply to bearings with two crowns of rollers.

Rollers 4 engage a radially outer lateral surface 5 of the inner ring 3 and a radially inner lateral surface 6 of the outer ring 2 facing each other and laterally held, in a direction parallel to a relative rotation axis A (shown not in scale in the accompanying figures for simplicity) between the inner 3 and outer 4 rings, by respective axial shoulders 7 integrally carried by either one or both the inner and outer rings 3 and 2; in the example shown, there are four shoulders 7, two being integrally carried by the outer ring 2 and two being integrally carried by the inner ring 3.

According to an aspect of the invention, the axial shoulders 7 each consist of an annular element 8 or 9 made of synthetic plastic material as an independent element from the outer 2 and inner 3 rings and which engages in a snapping manner either the inner ring 3 or the outer ring 2 so as to be axially integral with such a ring 2,3.

In combination, the inner 3 and outer 2 rings are each provided, at the respective radially outer 5 and inner 6 lateral surfaces and at least at respective opposite axial ends 10,11 of the outer ring 2 and 12,13 of the inner ring 3, with respective locking seats 14b,c, each adapted to receive in a snapping manner a respective annular element 8 or 9 made of synthetic plastic material.

According to an aspect of the invention, each seat 14b,c comprises at least one continuous annular groove 15. Two grooves 15 are obtained on the outer ring 2, facing the inner ring 3, and two grooves 15 are obtained on the inner ring 3, facing the outer ring 2.

In particular, the radially outer ring 2 is indeed provided with at least two opposite first locking seats 14b obtained at the opposite axial ends 10,11 and each comprising an annular end portion 16 of the radially inner lateral surface 6 of the outer ring 2, in addition to a respective annular groove 15. The annular end portions 16 are thus arranged at the ends 10,11 and are flared so as to make the outer ring 2 thinner (i.e. to reduce its radial thickness) towards the axial ends 10,11 thereof.

The respective continuous annular groove 15 of each first seat 14b is further obtained on the corresponding flared, annular end portion 16 of the seat 14b itself, substantially on the middle line. The flared end surface 16 delimiting each seat 14b is defined by an oblique surface with respect to axis A, in particular is defined by a stretch of a rounded conical surface, having its conicity (i.e. the opening angle) facing the rollers 4.

The radially inner ring 3 is instead provided with at least two opposite second locking seats 14c obtained at the opposite axial ends 12,13 of the inner ring 3 and each comprising an annular end portion 17 of the radially outer lateral surface 5 of the inner ring 3, in addition to a respective annular groove 15. The annular end portions 17 are thus arranged at the ends 12,13 and are flared so as to make the inner ring 3 thinner (i.e. to reduce its radial thickness) towards the axial ends 12,13 thereof.

The respective continuous annular groove 15 of each second seat 14c is further obtained on the corresponding flared annular end portion 17 of the seat 14c itself, substantially on the middle line. The flared surface end portion 17 delimiting each seat 14c is defined by an oblique surface with respect to axis A, in particular is defined by a stretch of a rounded conical surface having its conicity facing the side opposite to that of the corresponding surface portion 16 of the seat 14b, which it faces.

Finally, the continuous annular groove 15 of each locking seat 14b,c is made so as to have a rounded saw-tooth profile in radial section such that groove 15 has a maximum radial depth in a vicinal position with respect to the respective axial ring end 10,11,12,13 adjacent thereto, and thus on the side opposite to the conicity of the surface portion 16 or 17 on which groove 15 is obtained.

According to a feature of the invention, bearing 1 comprises at least a first annular element 8 made of synthetic plastic material which couples to the radially outer ring 2 and at least a second annular element 9 made of synthetic plastic material, which couples to the radially inner ring 3, on the side opposite to the annular element 8, for example, the annular element 8 being in a corresponding seat 14b and the annular element 9 being in a corresponding seat 14c, respectively.

In the non-limiting example shown, bearing 1 is provided with two annular elements 8b and 8c which couple to the outer ring 2, at the opposite ends 10, 11 and in seats 14b, and with two annular elements 9b and 9c, which couple to the inner ring 3, at the opposite ends 12, 13 and in seats 14c.

The annular elements 8b,c are shaped so as to be mirror-wise symmetric to each other; similarly, the annular elements 9b,c are shaped so as to be mirror-wise symmetric to each other.

Each annular element 8b,c and 9b,c (only the annular element 9b is shown in detail in FIGS. 4 and 5 for simplicity, while only the annular element 8b is shown in detail in FIGS. 6,7 for simplicity) is formed by molding in a single piece and comprises first circumferential sectors 18 and second circumferential sectors 19, arranged mutually alternating and integrally obtained in one piece with one another.

The first circumferential sectors 18 of the annular elements 8b,c are solid radial sectors, stiffer than the second sectors 19 of the annular elements 8b,c, and are radially delimited on the outside by a radially outer lateral surface 20 of the annular element 8b,c which mimics an axial annular profile of the locking seat 14b of end 10 for the annular element 8b and of the locking seat 14b of end 11 for the annular element 8c, so that the surface 20 of each annular element is also flared and defined by a stretch of a rounded conical surface having its conicity facing rollers 4, so as to couple in contact with the annular profile of the first seat 14b of the outer ring 2 which receives each element 8b,c.

The second circumferential sectors 19 of the annular elements 8b,c are instead each provided with a circumferential indentation 21 having a depth directed in axial direction and obtained on an axially outer front surface 22 of the annular element 8b,c, facing the opposite side of rollers 4. Each indentation is U-shaped on the axially outer front surface 22 (i.e. when observed looking towards the front surface 22) and detaches on the annular element 8b,8c a circumferential wing 23, elastically deformable in radial direction and which overhangingly extends radially on the outside of the annular element 8b,c.

Each wing 23 is delimited radially on the outside by the radially outer lateral surface 20 of the annular element 8b,c (which therefore couples to the corresponding seat 14b); the side surface 20 is however partially interrupted by indentation 21 at each sector 19 and towards the opposite ends of each second sector 19.

Furthermore, according to an aspect of the invention, each wing 23 is provided at the radially outer lateral surface 20 of the annular element 8b,c with a radial tooth 24 which couples within the continuous annular groove 15 of the locking seat 14b of the end 10 or 11 engaged by the respective annular element 8b or 8c; indeed, each tooth 24 has a circumferential, axial profile which mimics that of the continuous annular groove 15 and radially overhangingly protrudes from the lateral surface 20 (FIG. 7), so as to engage groove 15 in a snapping manner when the annular element 8b,c is pushed into the respective seat 14b, while the lateral surface 20 couples fit to the annular surface portion 16.

The first circumferential sectors 18 of the annular elements 9b,c are also solid radial sectors, stiffer than the second sectors 19, of the annular elements 9b,c and are radially delimited on the inside by a radially inner lateral surface 25 of the annular element 9b,c which mimics an axial annular profile of the locking seat 14c of end 12 for the annular element 9b and of the locking seat 14c of end 13 for the annular element 9c, so that the surface 25 of each annular element 9b,c is also flared and defined by a stretch of a rounded conical surface having its conicity facing the opposite side of rollers 4, so as to couple in contact with the axial annular profile of the second seat 14c of the inner ring 3 which receives each element 9b,c.

The second circumferential sectors 19 of the annular elements 9b,c are each provided, as their corresponding annular elements 8b,c, with a circumferential indentation 26 having a depth directed in axial direction and obtained on an axially outer front surface 27 of the annular element 9b,c, facing the opposite side of rollers 4. Each indentation 26 is U-shaped on the axially outer front surface 27 (i.e. when observed looking towards the front surface 27) and detaches on the annular element 9b,9c a circumferential wing 28, elastically deformable in radial direction and which radially overhangingly extends radially on the inside of the annular element 9b,c.

Each wing 28 is delimited radially on the inside by the radially inner lateral surface 25 of the annular element 9b,c (which therefore couples to the corresponding seat 14c); the lateral surface 25 is however partially interrupted by indentation 26 at each sector 19 and towards the opposite ends of each second sector 19.

Moreover, according to an aspect of the invention, each wing 28 is provided at the radially inner lateral surface 25 of the annular element 9b,c with a radial tooth 29 which couples within the continuous annular groove 15 of the locking seat 14c of end 12 or 13 engaged by the respective annular element 9b or 9c; indeed, each tooth 29 has a circumferential axial profile which mimics that of the continuous annular groove 15 and radially overhangingly protrudes from the lateral surface 25 (FIG. 5), so as to engage groove 15 in a snapping manner when the annular element 9b,c is pushed into the respective seat 14b, while the lateral surface 25 couples fit to the annular surface portion 16 of such a seat.

In particular, the radial teeth 24 and 29 have the same circumferential extension as the corresponding elastically deformable wings 23,28, so as to ensure a firm hold of the annular elements 8*b,c* and 8*b,c*, in the respective seats 14*b,c* and within the continuous annular grooves 15.

Thereby, the annular elements 8*b,c* and 9*b,c* made of plastic material and defining the axial shoulders 7 of bearing 1 are firmly constrained to the rings 2,3 in axial direction, also by virtue of the different stiffness of sectors 18 and 19, but are not constrained in an angularly integral manner in the respective seats 14*b,c* except due to the friction between each annular element 8*b,c* or 9*b,c* and the respective seat 14*b,c*.

In the example shown, the first sectors 18 of each first 8*b,c* and second 9*b,c* annular element made of synthetic plastic material are provided, on a frontal face 30 thereof facing rollers 4, with respective pockets 31 filled, in use, with a lubricating fluid, e.g. oil or grease. Pockets 31 are preferably obtained at the sectors 18 to prevent the elasticity of wings 23,28 from being disturbed and to not weaken the sectors 19 excessively. In all cases, pockets 31 may be obtained in any angular position on the faces 30 of the annular elements 8 and 9.

In the example shown, the pockets consist of radially through, radial cuttings 31, obtained on the faces 30 so as to interrupt both the respective radially outer 20 and inner 32 lateral surfaces of the annular element 8*b,c* made of synthetic plastic material and both the respective radially outer 33 and inner 25 lateral surfaces of the annular element 9*b,c* made of synthetic plastic material.

Figure 2:
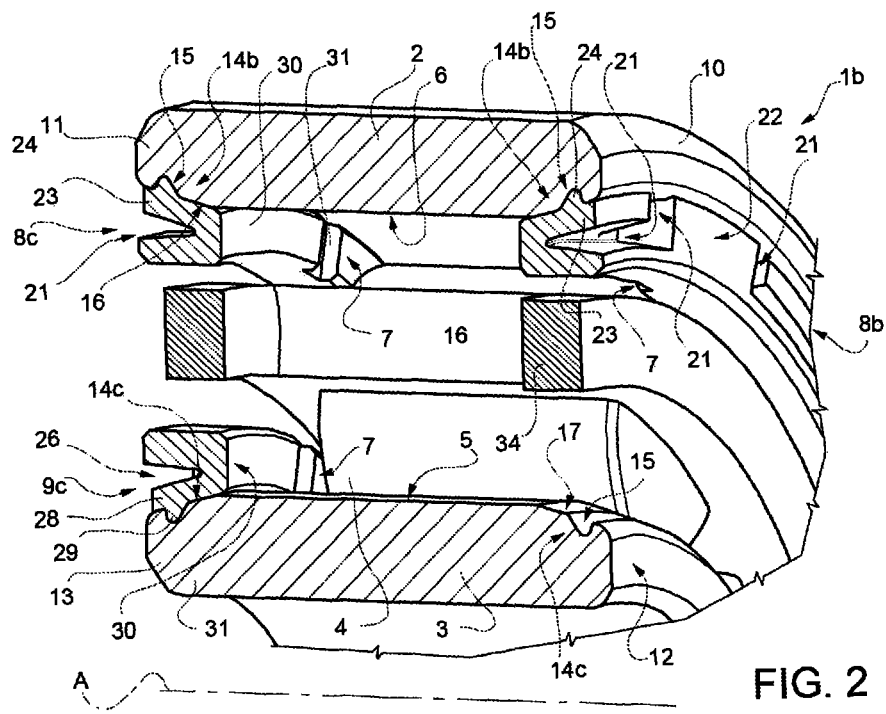
Figure 3:
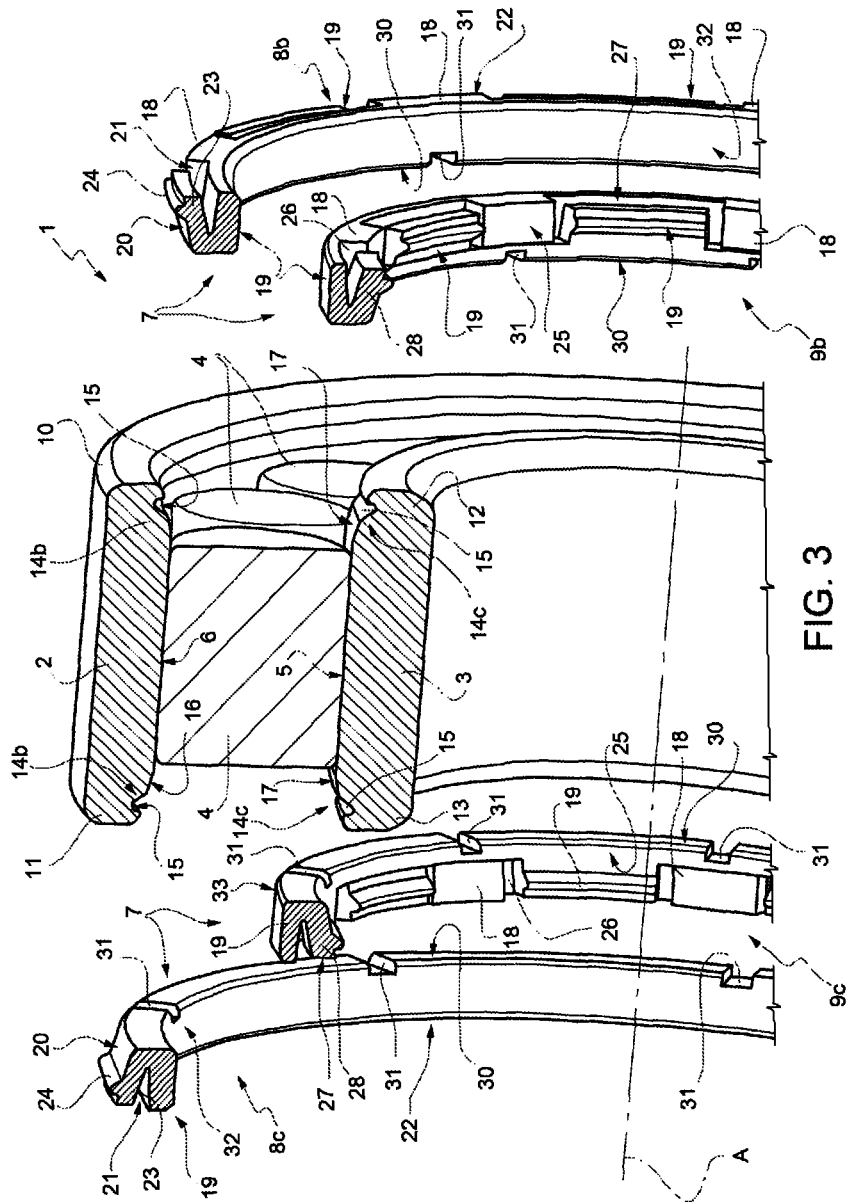
FIG. 3 shows again a front three-quarters perspective view in radial section, with parts removed for simplicity, of an exploded view of the bearing in FIG. 1.
Figure 4:
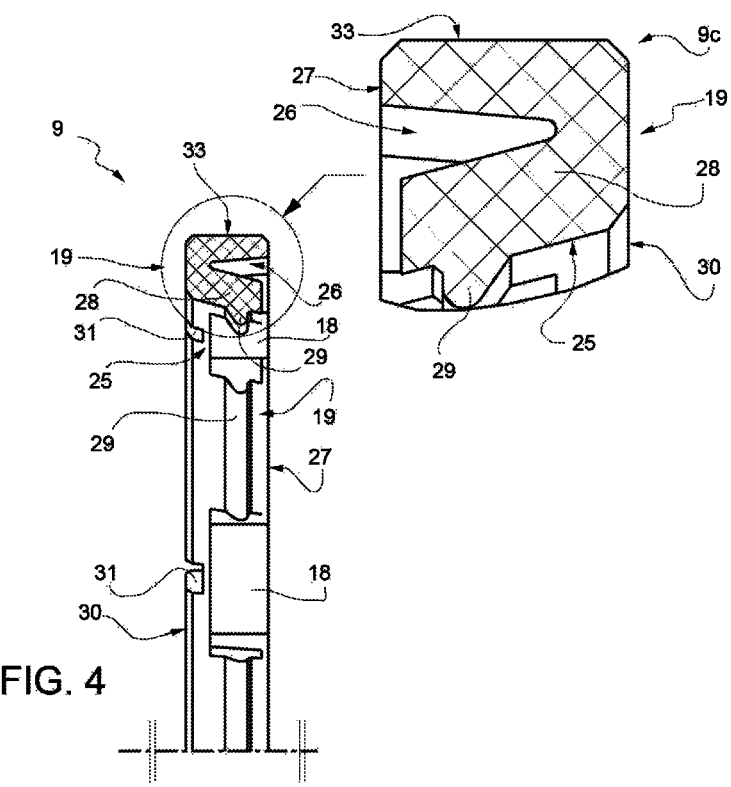
FIGS. 4 and 5 show a radial section view on enlarged scale, with a detail on a further enlarged scale, and a front elevation view of a first element of the bearing in FIGS. 1 and 2, respectively.
Figure 5:
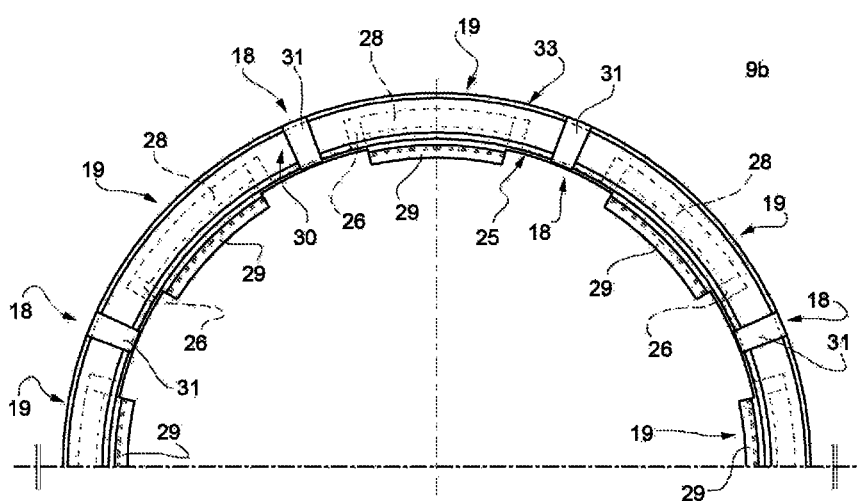

With reference now to FIG. 2, in which details either similar or equal to those described above are indicated by the same numerals for simplicity, reference numeral 1*b* indicates a rolling bearing with cylindrical rollers 4 comprising an outer ring 2 and an inner ring 3 and annular elements 8*b,c* and 9*c* which are identical to those already described.

The only differences with bearing 1 consist in that an annular element 9*c* is missing, so that the seat 14*c* of end 12 is left empty, three shoulders 7 being sufficient to axially block the rollers 4, and in that bearing 1*b* has a small number of rollers 4 (while bearing 1 is of the full-complement roller type) which are held by a cage 34, which is missing in bearing 1.

It is apparent that only two shoulders 7 could be sufficient to ensure the axial blocking of rollers 4, provided that they are mounted on opposite sides, whereby the annular element 8*c* fitted in the seat 14*b* of end 11 could also be missing.

Various bearing configurations can be obtained, simply and rapidly, using the same rings 2, 3 by virtue of the construction of shoulders 7 by means of independent annular elements made of synthetic plastic material. Furthermore, the rollers 4 axially touch the faces 30 made of synthetic plastic material, which may be selected so as to have low friction, e.g. containing polytetrafluoroethylene or other material having similar creep properties, which are however lubricated with the lubricating fluid which is collected in pockets 31.

The shape of the annular elements 8,9 and of seats 14*b,c* then allows to ensure an optimal axial blocking and simultaneously an easy snap-insertion of the elements 8,9 in seats 14*b c*.

All the objects of the invention are thus achieved.

The invention claimed is:

1. A rolling bearing of the roller type, comprising:
    a radially outer ring,
    a radially inner ring, and
    a plurality of revolving bodies defined by rollers disposed between the radially outer ring and the radially inner ring and grouped into at least one crown of revolving bodies, the rollers engaging a radially outer lateral surface of the inner ring and a radially inner lateral surface of the outer ring facing each other and being laterally held, in a direction parallel to a relative rotation axis (A) between the inner ring and the outer ring, by respective axial shoulders supported by the inner ring or the outer ring or by both the inner ring and the outer ring; and wherein
    i) the axial shoulders each consist of an annular element made of synthetic plastic material as an independent element from the outer ring and from the inner ring that engages in a snapping manner the inner ring to be axially integral with the inner ring or the outer ring to be axially integral with the outer ring or both the inner ring and the outer ring to be axially integral with the inner ring and the outer ring;
    ii) the inner ring and the outer ring are each provided at the respective radially outer and inner lateral surfaces and at least at one of each respective opposite axial ends thereof, with respective locking seats each adapted to receive in a snapping manner a respective annular element made of synthetic plastic material and each having at least one continuous annular groove disposed on one of the outer ring and the inner ring and facing the other ring;
    iii) each annular element made of synthetic plastic material realizing an axial shoulder is integrally formed in one piece by first and second circumferential sectors arranged in reciprocally alternating manner; the first circumferential sectors being solid radial sectors, stiffer than the second sectors, and the second circumferential sectors being each provided with a circumferential indentation having depth directed in axial direction and made on an axially outer front surface of the annular element, facing the opposite side of the rollers, wherein the indentation is U-shaped on the axially outer front surface of the annular element, and detaches from the annular element a circumferential wing, elastically deformable in radial direction;
    iv) the circumferential wing being provided with a radial tooth, which couples within the continuous annular groove of one locking seat, having a circumferential and axial profile which mimics that of the continuous annular groove.

2. The bearing according to claim 1, wherein the radially outer ring is provided with at least two opposite first locking seats disposed at the opposite axial ends of the outer ring and each having an annular end portion of the radially inner lateral surface of the outer ring that is flared to thin the outer ring towards its axial ends; the respective continuous annular groove of each first seat disposed on the corresponding flared, annular surface end portion of the first seat.

3. The bearing according to claim 2, wherein the radially inner ring is provided with at least two opposite second locking seats disposed at the opposite axial ends of the inner ring and each having an annular end portion of the radially outer lateral surface of the inner ring that is flared to thin the inner ring towards its axial ends; the respective continuous annular groove of each second seat disposed on the corresponding flared, annular surface end portion of the second seat.

4. The bearing according to claim 1, wherein the continuous annular groove of each locking seat has a rounded saw tooth profile in radial section such that the continuous annular groove has a maximum radial depth in a vicinal position with respect to the respective axial ring end adjacent thereto.

5. The bearing according to claim 1, wherein the at least one annular element comprises a first annular element coupled to the radially outer ring and being radially delimited by a radially outer lateral surface complementary to an axial annular profile of the locking seat of the outer ring; wherein
the circumferential wing overhangingly extends outwards; each wing being radially delimited on the exterior by the radially outer lateral surface of the first annular element, which is partially interrupted by the indentation towards opposite ends of each second sector.

6. The bearing according to claim 5, wherein the at least one annular element comprises a second annular element coupled to the radially inner ring and being radially delimited by a radially inner lateral surface complementary to an axial annular profile of the locking seat of the inner ring, wherein
the the circumferential wing overhangingly extends inwards; each wing being radially delimited on the inside by the radially inner lateral surface of the second annular element, which is partially interrupted by the indentation towards opposite ends of each second sector.

7. The bearing according to claim 6, further comprising a pair of second annular elements shaped to be mirror-wise symmetric, each of which couples to one of the opposite axial ends of the inner ring.

8. The bearing according to claim 5, further comprising a pair of first annular elements shaped to be mirror-wise symmetric, each of which couples to one of the opposite axial ends of the outer ring.

9. The bearing according to claim from 5, wherein the circumferential extension of the radial tooth is the same as that of the elastically deformable wing.

10. The bearing according to claim 5, wherein each first and each second annular element made of synthetic plastic material is provided, on a face thereof facing the rollers, with respective pockets filled with a lubricating fluid.

11. The bearing according to claim 10, wherein the pockets are formed by radially through radial cuttings preferably disposed on the first sectors and which interrupt both respective outer and inner radial lateral surfaces of the first and second annular elements made of synthetic plastic material.

12. A rolling bearing of the roller type, comprising:
at least one ring, the at least one ring comprising a radially outer ring and a radially inner ring;
a plurality of rollers disposed between the radially outer ring and the radially inner ring;
a first annular element having an axial shoulder, the axial shoulder comprising a synthetic plastic, snap-fit into the at least one ring,
the first annular element being configured to limit lateral movement of the plurality of rollers between the inner ring and the outer ring, and
the at least one ring including a first locking seat at an axial end, the first locking seat including an annular groove and being configured to engage the first annular element when the first annular element is snap-fit into the at least one ring;
wherein the first annular element is integrally formed in one piece by first and second alternating circumferential sectors, the first circumferential sectors being solid radial sectors, and the second circumferential sectors each including a flexible wing, each wing including a radial tooth having a profile complementary to a profile of the annular groove.

13. The bearing according to claim 12, including a second annular element having an axial shoulder comprising a synthetic plastic snap-fit into the at least one ring, the second annular element being configured to limit lateral movement of the plurality of rollers between the inner ring and the outer ring,
the at least one ring including a second locking seat at an axial end, the second locking seat including an annular groove and being configured to engage the second annular element when the second annular element is snap-fit into the at least one ring;
wherein the second annular element is integrally formed in one piece by first and second alternating circumferential sectors, the first circumferential sectors of the second annular element being solid radial sectors, and the second circumferential sectors of the second annular element each including a flexible wing, each wing of the second annular element including a radial tooth having a profile complementary to the profile of the annular groove of the second locking seat.

14. The bearing according to claim 12, wherein the first annular element is snap-fit to the outer ring and the second annular element is snap-fit to the inner ring.

15. The bearing according to claim 12, wherein the annular groove is continuous.

16. The bearing according to claim 12, wherein the second circumferential sectors each include a U-shaped circumferential indentation on a side axially opposite the plurality of rollers having an axial depth, the flexible wing defining a portion of the indentation.

* * * * *